United States Patent
Lumpkin

(10) Patent No.: US 7,507,025 B2
(45) Date of Patent: Mar. 24, 2009

(54) INFRARED THERMOMETER WITH AN AXIALLY ACTUATED TEMPERATURE SENSOR

(76) Inventor: Wayne R Lumpkin, 7060 West Belmont Dr., Littleton, CO (US) 80123

(*) Notice: Subject to any disclaimer, the term of this patent is extended or adjusted under 35 U.S.C. 154(b) by 104 days.

(21) Appl. No.: 11/399,887

(22) Filed: Apr. 7, 2006

(65) Prior Publication Data

US 2007/0047620 A1    Mar. 1, 2007

Related U.S. Application Data

(60) Provisional application No. 60/596,076, filed on Aug. 29, 2005.

(51) Int. Cl.
G01K 1/08 (2006.01)
G01J 5/04 (2006.01)

(52) U.S. Cl. ...................... 374/208; 374/121

(58) Field of Classification Search ......... 374/208–209, 374/121, 131, 129, 150, 155, 141, 151, 158; 600/549; 62/129–130; 250/338.1
See application file for complete search history.

(56) References Cited

U.S. PATENT DOCUMENTS

| | | | |
|---|---|---|---|
| 2,580,753 A | 1/1952 | Frentzel | |
| 2,674,882 A | 4/1954 | Doggett | |
| 4,174,631 A | 11/1979 | Hammerslag | |
| 4,538,927 A | 9/1985 | Jochemczyk et al. | |
| 4,728,369 A | 3/1988 | Hammerslag et al. | |
| 4,895,164 A | 1/1990 | Wood | |
| 4,993,424 A * | 2/1991 | Suszynski et al. | 600/549 |
| D321,487 S | 11/1991 | Manno | |
| 5,159,936 A | 11/1992 | Yelderman et al. | |
| 5,340,215 A * | 8/1994 | Makita et al. | 374/121 |
| 5,368,038 A | 11/1994 | Fraden | |
| D370,860 S | 6/1996 | Pompei et al. | |
| 5,645,350 A * | 7/1997 | Jang | 374/158 |
| 5,991,652 A | 11/1999 | Barthelemy et al. | |
| 6,001,066 A * | 12/1999 | Canfield et al. | 600/559 |
| 6,336,742 B2 | 1/2002 | Fukura et al. | |
| 6,375,622 B1 * | 4/2002 | Kao et al. | 600/485 |
| D457,443 S | 5/2002 | Riester-Freudenmann | |
| 6,435,711 B1 | 8/2002 | Gerlitz | |
| 6,536,306 B1 | 3/2003 | Harris | |
| 6,751,497 B2 * | 6/2004 | Fraden | 600/474 |
| 6,811,306 B2 | 11/2004 | Gerlitz | |
| 6,827,487 B2 | 12/2004 | Baumbach | |
| 7,060,038 B2 * | 6/2006 | Letort et al. | 600/549 |
| 2001/0021218 A1 | 9/2001 | Fukura et al. | |

(Continued)

FOREIGN PATENT DOCUMENTS

JP    408062042 A    3/1996

*Primary Examiner*—Patrick J Assouad
*Assistant Examiner*—Bret Adams
(74) *Attorney, Agent, or Firm*—Swanson & Bratschun LLC

(57) ABSTRACT

An infrared thermometer has an elongate housing extending along an axis with an actuator at one housing end, the actuator being actuated by engagement along the axis. The housing further includes an opening at one end and a temperature sensor operatively associated with the opening. The temperature sensor can be advanced from a retracted position within the housing to an extended position operatively associated with the opening for sensing the temperature of an object. As the sensor moves between the retracted and the extended position, the sensor changes from a dormant state to a sensing state.

7 Claims, 5 Drawing Sheets

U.S. PATENT DOCUMENTS

| | | |
|---|---|---|
| 2002/0143257 A1 | 10/2002 | Newman et al. |
| 2002/0163953 A1 | 11/2002 | Yu |
| 2002/0186745 A1 | 12/2002 | Pompei et al. |
| 2002/0193703 A1 | 12/2002 | Sato et al. |
| 2003/0016728 A1 | 1/2003 | Gerlitz |
| 2003/0067958 A1 | 4/2003 | Jang |
| 2003/0076867 A1* | 4/2003 | Mundt et al. ............ 374/45 |
| 2003/0212341 A1 | 11/2003 | Pompei et al. |
| 2004/0076215 A1* | 4/2004 | Baumbach ............ 374/29 |
| 2004/0095985 A1 | 5/2004 | Ko et al. |
| 2004/0101025 A1* | 5/2004 | Welker ............ 374/147 |
| 2004/0215070 A1* | 10/2004 | Letort et al. ............ 600/364 |
| 2006/0109886 A1 | 5/2006 | Harris |
| 2006/0215728 A1* | 9/2006 | Jang ............ 374/121 |
| 2007/0106172 A1* | 5/2007 | Abreu ............ 600/549 |

\* cited by examiner

INFRARED THERMOMETER WITH AN AXIALLY ACTUATED TEMPERATURE SENSOR

RELATED APPLICATIONS

This application claims priority from U.S. Provisional Patent Application Ser. No. 60/596,076, filed Aug. 29, 2005, entitled "Infrared Thermometer with Retractable Temperature Sensor", which is hereby incorporated by reference.

TECHNICAL FIELD

The present invention is directed toward thermometers and more particularly toward a thermometer with an axially actuated sensor, and further toward an infrared thermometer with a retractable infrared sensor.

BACKGROUND OF THE INVENTION

A large number of infrared thermometers are known in the art such as medical thermometers and thermometers for use determining the temperature of foods and drinks, such as wine. Representative infrared thermometers are described in Gerlitz, U.S. Patent Application Publication No. US 2003/0016728 A1; Gerlitz, U.S. Pat. No. 6,811,306; Fraden, U.S. Pat. No. 6,751,497; Gerlitz, U.S. Pat. No. 6,435,711; Fukura, U.S. Pat. No. 6,336,742; Barthelemy, U.S. Pat. No. 5,991,652; Suszynski, U.S. Pat. No. 4,993,424; Wood, U.S. Pat. No. 4,895,164; Ko, U.S. Patent Application Publication No. US 2004/0095985 A1; Jang, U.S. Patent Application Publication No. US 2003/0067958 A1; Pompei, U.S. Patent Application Publication No. US 2002/0186745 A1, the disclosure of each of which are incorporated in their entirety herein.

One known infrared thermometer intended for use with wine consists of an elongate housing having an opening at a distal end with a temperature sensor operatively associated with the opening whereby the sensor can be used to sense the temperature of wine or other objects. One problem with this configuration is the infrared sensor is subject to contamination when not in use. One known device provides a cover for the infrared sensor, but the cover must be manually removed from the elongate housing in order to expose the sensor, much like a cap must be removed from a pen. Known infrared wine thermometers also typically require depressing of a button in order to actuate the infrared sensor. Known devices require depressing the actuator button perpendicular to an axis of the housing, which can be cumbersome to a user.

The present invention is intended to overcome one or more of the problems discussed above.

SUMMARY OF THE INVENTION

A first aspect of the present invention is an apparatus for sensing temperature. The apparatus comprises an elongate housing extending along a housing axis between proximal and distal housing ends. A temperature sensor is operatively associated with the housing. An actuator is coupled to the temperature sensor at the proximal end of the housing along the housing axis. The actuator is engaged by a user along the housing axis to actuate the temperature sensor. The temperature sensor may be an infrared sensor. The actuator may comprise a button, the button being depressed by action along the housing axis toward the distal housing end. The infrared sensor may be located at the distal end along the housing axis and reside within the distal housing end. In such an embodiment, the actuator may be a button as described above with the button further being operatively associated with the infrared sensor to cause the infrared sensor to extend from the distal housing as the button is depressed. The apparatus may further comprise a display operatively associated with the housing proximate the proximal housing end. The display is situated on the housing to enable a user to grip the distal end of the housing with four fingers while not obstructing the display and while being able to actuate the actuator by movement of the user's thumb along the housing axis toward the distal housing end.

Another aspect of the invention is an apparatus for sensing the temperature of an object. The apparatus includes a housing having an opening and a temperature sensor within the housing, the temperature sensor being moveable between a retracted position within the housing and an extended position operatively associated with the opening to enable the temperature sensor to accurately sense the temperature of an object outside the housing. A switch may be provided in operative association with the temperature sensor for switching the temperature sensor between a dormant state and a sensing state. An actuator may be provided in operative association with the switch for actuating the switch as the temperature sensor is moved between the retracted and the extended positions to switch the temperature sensor to the sensing state. The housing may be elongate and extend along an axis. The opening may be provided at a distal end of the housing along the axis. In this embodiment, a chassis is provided within the housing moveable axially of the housing, the chassis having a proximal and a distal end. The sensor is attached to the distal end of the chassis proximate the opening and the proximal end of the chassis is configured to extend axially from the proximal end of the housing opposite the opening with the sensor in the retracted position. The proximal end of the chassis is advanced axially toward the housing to move the sensor to the extended position. A spring biases the proximal end of the chassis to extend from the proximal end of the housing when the sensor in the retracted position. A switch may be provided in operative association with the temperature sensor for switching the temperature sensor between a dormant state and a sensing state. The apparatus may further include an actuator operatively associated with the switch for actuating the switch as the temperature sensor is moved from the retracted to the extended position to switch the temperature sensor to the sensing state.

A cover may be provided in operative association with the opening. The cover is moveable between a covering position covering the opening and an open position not covering the opening. A link between the chassis and the cover is configured to move the cover between the covering position and the opening position as the proximal end of the chassis is axially advanced toward the housing to move the sensor from the retracted position to the extended position.

Yet another aspect of the present invention is a method of measuring the temperature of an object. The method includes providing a temperature sensor within a housing, the sensor being moveable between a retracted position relative to the housing and an extended position relative to the housing. In the retracted position, the temperature sensor resides within the housing. In the extended position, the sensor is positioned relative to the housing to accurately sense the temperature of an object outside the housing. The temperature sensor has a dormant state and a sensing state. As the temperature sensor is moved from the retracted position to the extended position the temperature sensor is switched from the dormant state to the sensing state. An opening may be provided in the housing operatively associated with the temperature sensor when the temperature sensor is in the extended position. A cover may be provided in operative association with the opening having a covering position covering the opening and an open position not covering the opening. The method further includes moving the cover between the covering position and the opening position as the temperature sensor is moved from the retracted position to the extended position.

The temperature sensor in accordance with the present invention provides an ergonomically efficient device for measuring the temperature of objects, and more particularly, the temperature of wine either in a bottle or in a glass. By providing a retractable sensor, the infrared thermometer of the present invention protects the sensor when it is not in use. In an embodiment combining extension of the sensor from the housing with actuation of the sensor, battery life can be extended.

DETAILED DESCRIPTION OF THE INVENTION

Figure 1:
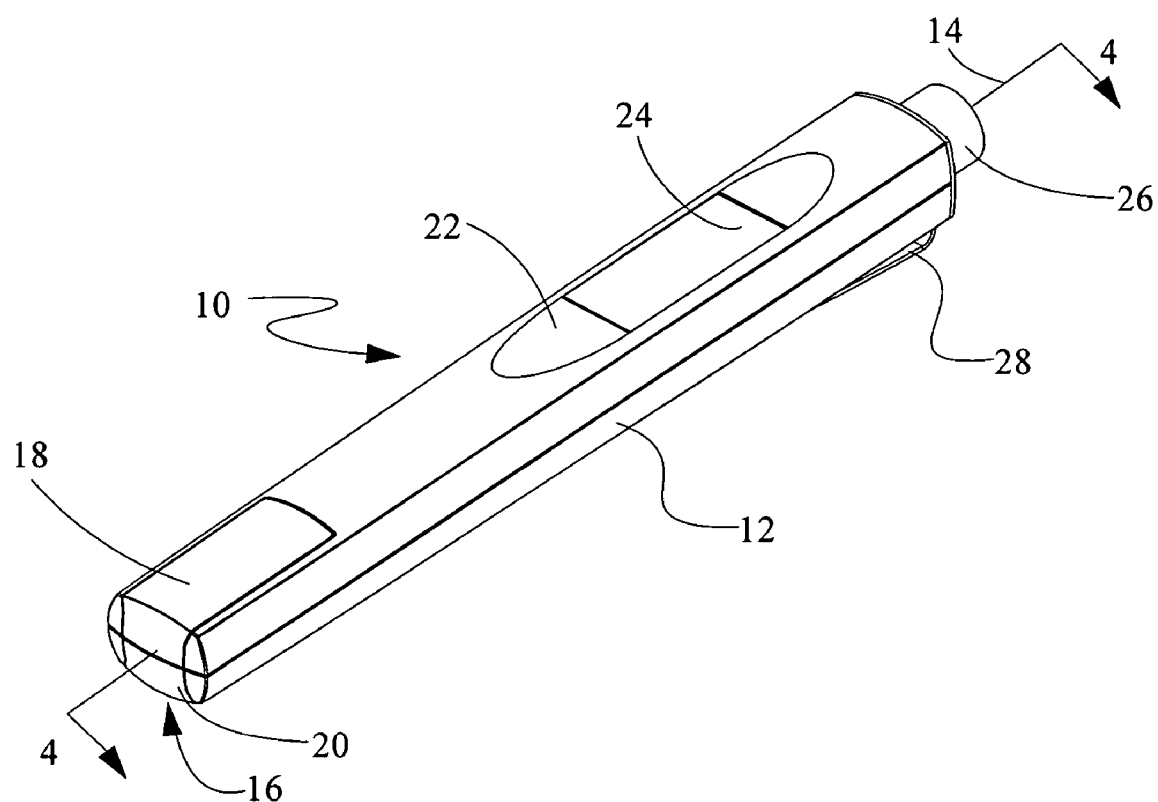
FIG. 1 is a perspective view of an infrared thermometer in accordance with the present invention.

A thermometer 10 in accordance with the present invention is shown in a perspective view in FIG. 1. In one embodiment, the thermometer 10 is a retractable sensor infrared thermometer 10 which consists of an elongate housing 12 extending along an axis 14. The housing has an opening 16 at a distal end. As illustrated in FIG. 1, the opening 16 is covered by a cover comprising a top door 18 and a bottom door 20. A transparent window 22 is provided in the housing top covering an LCD display 24. An actuator button 26 extends axially from the proximal end of the housing and its operation will be discussed in greater detail below. A clip 28 is operatively associated with the bottom of the housing to facilitate attaching the infrared thermometer 10 to a shirt pocket or the like.

Figure 2:
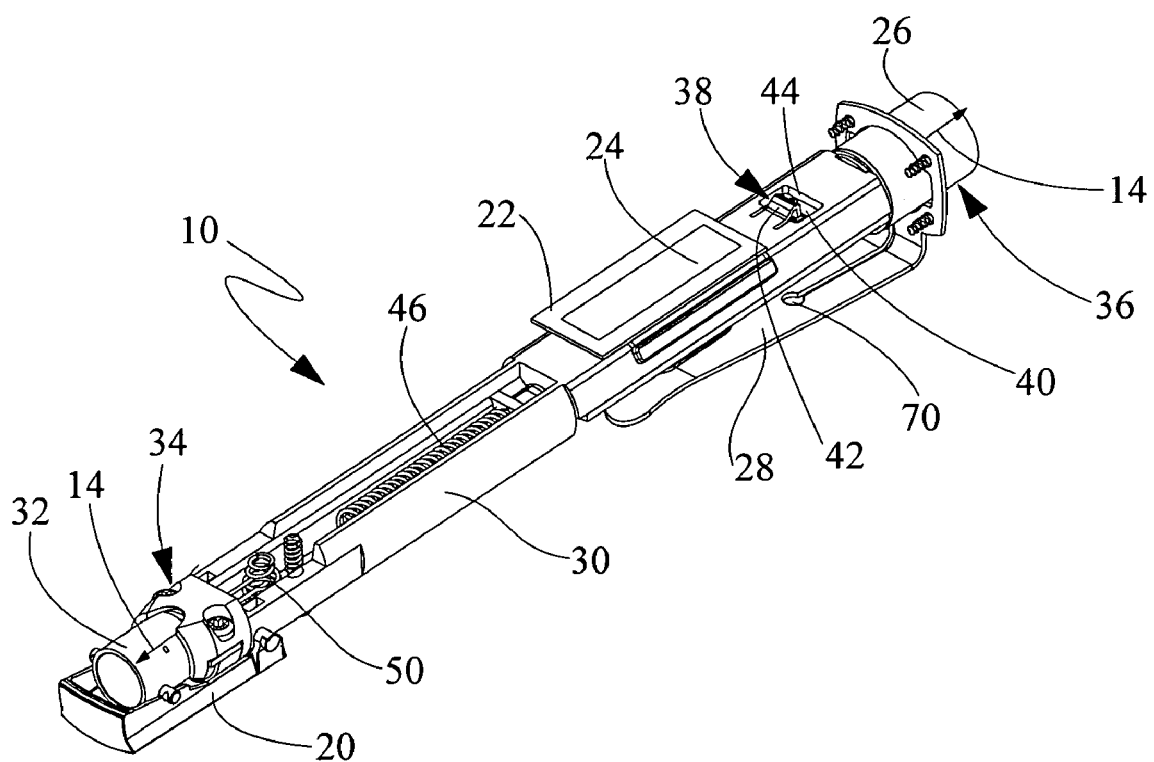
FIG. 2 is a perspective view of the infrared thermometer of FIG. 1 with sections of the housing removed for clarity.

FIG. 2 illustrates the retractable sensor infrared thermometer 10 of FIG. 1 with much of the housing removed for the sake of clarity. Remaining in FIG. 2 is the bottom door 20, the clip 28 and the window 22. An elongate chassis 30 extends along the axis 14 within the elongate housing 12. An infrared sensor 32 is attached the distal end 34 of the elongate chassis 30. The proximal end of the elongate chassis 30 at 36 defines the actuator button 26. The LCD display 24 is housed within the chassis along with a battery and other electronics associated with the operation of the infrared thermometer 10. A cam actuator 38 is attached in a cantilevered fashion to the chassis overhanging an opening 40. The cam actuator 38 has an inclined cam surface 42 and an inwardly radially extending lip 44 which is operatively associated with a switch for the infrared thermometer electronics which resides in the elongate chassis 30 directly below the inwardly extending lip 44.

Figure 3:
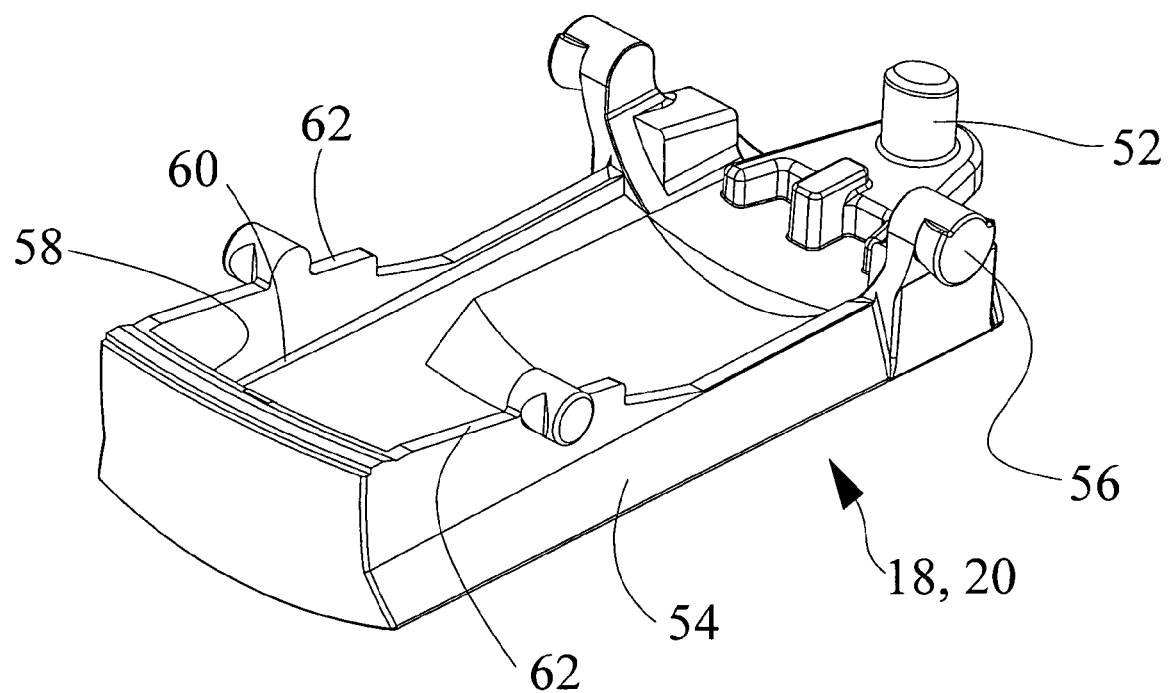
FIG. 3 is a perspective view of a door of the infrared thermometer of FIG. 1.
Figure 4:
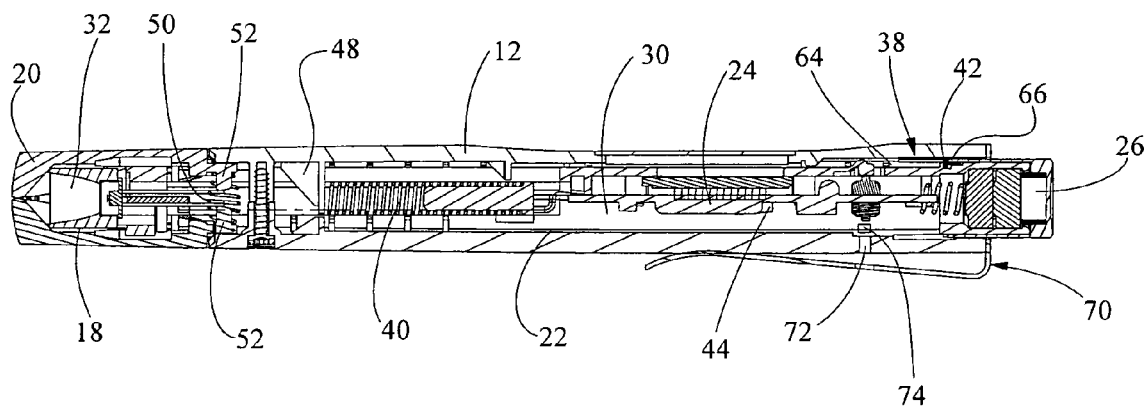
FIG. 4 is a cross-section view taken along line 4-4 of FIG. 1.

Also exposed in FIG. 2 is a spring 46 which is operatively disposed between the chassis and a spring stop 48 extending from the housing 12 which is best seen in FIG. 4. Also exposed in FIG. 2 is a door spring 50 which is received on opposing spring posts 52 on the bottom and top doors 18, 20. The spring post 52 is best viewed in FIGS. 3 and 4.

Referring to FIG. 3, the top and bottom doors 18, 20 are identical in configuration as shown in FIG. 3. The doors 18, 20 define a cover for the opening at the distal end of the elongate housing. Each door consists of a body 54 having a spring post 52 extending perpendicular to the length of the body at a proximal end. A hinge 56 is integrally formed with the body 54 to allow the doors 18, 20 to pivot thereabout from receptacles in the housing. At a distal end of the body 54 is a wall 58 which helps to close the opening 16. Inclined surface 60 extends between the wall 58 and the elongate surface of the housing. Stops 62 extend radially from the door for engagement with the housing to prevent doors from flopping open.

Referring to FIG. 4, which is a cross-section of the infrared thermometer 10, the elongate chassis 30 is illustrated within the housing 12. The door spring 50 is illustrated in FIG. 4 received on the spring posts 52. As illustrated in FIG. 4, the door spring 50 biases the spring posts 52 away from each other rotating the top and bottom doors 18, 20 to a closed position about the hinges 56. The spring 40 biases the elongate chassis 30 to the right as illustrated in FIG. 4, to maintain the actuator button 26 at the proximal end of the elongate chassis 30 extending from the proximal end of the housing 12.

As illustrated in FIG. 4, the temperature sensor 32 is in a retracted position relative to the housing and residing within the housing. The doors 18, 20 are closed to protect the temperature sensor 32. By depressing the actuator button 26 so as to move the proximal end of the elongate chassis 30 toward the housing 12 along the axis 14, the infrared sensor 32 contacts the inclined surfaces 60 of the top and bottom doors to bias the doors open against the action of the spring 50 and move the infrared sensor 32 to an extended position relative to the housing 12 and relative to the opening 16 to position the infrared sensor 32 relative to the housing 12 to allow the sensor to accurately sense the temperature of an object outside the housing.

With the temperature sensor in the retracted position within the housing, the infrared sensor 32 is in a dormant state where it is not energized to sense temperatures. Again, as the chassis 30 is moved to the left relative to the housing 12, as illustrated in FIG. 4, the inclined cam surface 42 of the cam actuator 38 engages an inclined actuator surface 64 extending radially inward from the housing 12. This in turn presses the cam actuator 38 so that the inward extending lip 44 contacts and depresses button 66 operatively associated with the switch 68 of the thermometer electronics which in turn switches the temperature sensor from a dormant state to a sensing state, allowing it to sense temperature as the sensor assumes the extended position. As force on the actuator button 26 is released, the spring 46 biases the elongate chassis 30 to the right relative to the housing 12, allowing the door spring 50 to close the doors 18, 20 as the temperature sensor returns to its retracted position and the temperature sensor returns to its dormant state as the cam actuator 38 rebounds to the position illustrated in FIG. 4.

Referring further to FIG. 4, the window 22 extends axially along the housing a sufficient distance so that the LCD display 24 can be viewed beneath the window as the actuator button 26 is depressed.

Referring to FIG. 2, the clip 28 includes an access hole 70 which is aligned with a housing orifice 72 which in turn is aligned with a Fahrenheit/Celsius button 74 operatively associated with the processor 82 to allow the processor to switch the display from Fahrenheit to Celsius at the behest of an operator.

Figure 5:
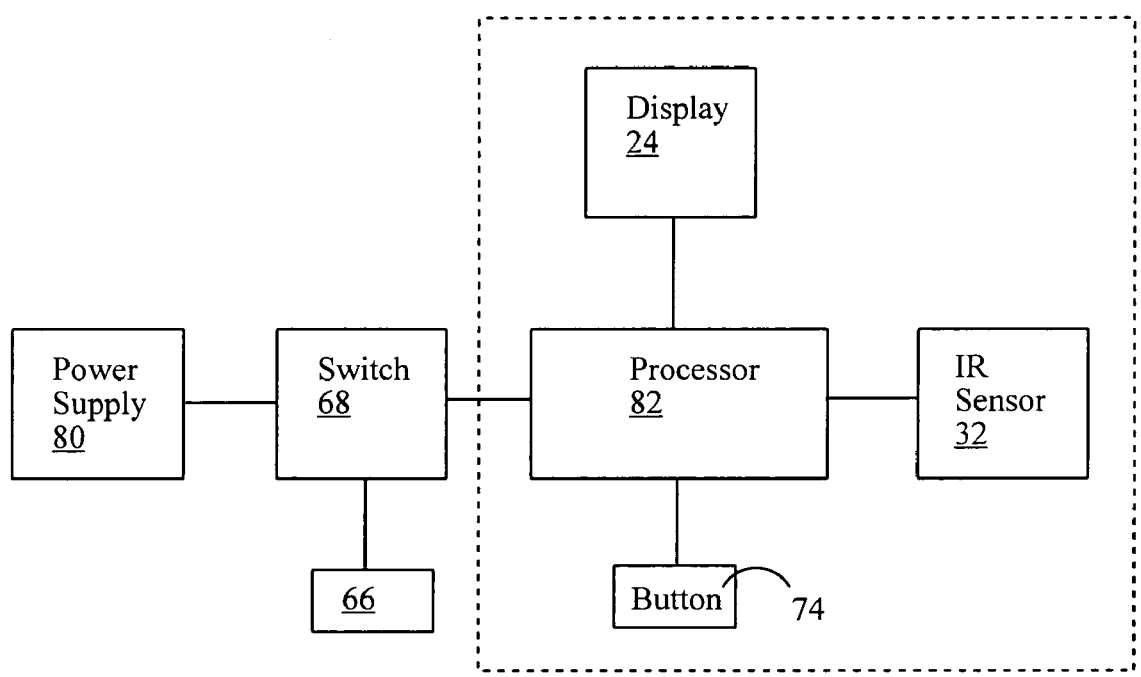
FIG. 5 is a schematic functional block diagram of the circuitry of the infrared thermometer of FIG. 1.

The electronics of the retractable sensor infrared thermometer 10 are illustrated schematically in FIG. 5. A power supply 80, which in the present embodiment is a battery, is in electrical communication with the switch 68 which in turn is in electrical communication with a processor 82. The processor 82 is in electrical communication with the infrared sensor 32 and the LCD display 24. The button 74, as described above, can be depressed to switch the processor between a Fahrenheit mode and a Celsius mode which displays a detected temperature in the display 24 as either Fahrenheit or Celsius. The switch 68 is operatively associated with the button 66 which actuates the switch 68 when the button 66 is depressed in the manner described above to energize the processor, display and sensor, thus putting the sensor in a sensing state.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

What is claimed is:

1. An apparatus for sensing temperature, the apparatus comprising:
   an elongate housing extending along a housing axis between proximal and distal housing ends;
   an infrared temperature sensor at the distal housing end and residing within the housing; and
   an actuator coupled to the infrared temperature sensor on an exterior of the housing along the housing axis, the actuator being configured to be engaged and moved by a user by a movement of the user in a direction of the housing axis relative to the housing to actuate the temperature sensor, wherein the actuator comprises a button, the button being depressed by action along the housing axis toward the distal housing end and the button being operatively associated with the infrared sensor to cause the infrared sensor to extend from the distal housing end as the button is depressed.

2. An apparatus for sensing temperature, the apparatus comprising:
   an elongate housing extending along a housing axis between proximal and distal housing ends;
   a temperature sensor operatively associated with the housing; and
   an actuator at the proximal end of the housing along the housing axis coupled to the temperature sensor on an exterior of the housing along the housing axis, the actuator comprising a button configured to be depressed by a user by action along the housing axis toward the distal housing end to actuate the temperature sensor; and
   a cover attached to the housing movable between a first position covering the temperature sensor and a second position exposing the temperature sensor, the cover being operatively associated with the actuator to move between the first and second positions by the button being depressed.

3. An apparatus for sensing the temperature of an object comprising:
   an elongate housing extending along an axis having an opening at a distal end of the housing along the axis;
   a temperature sensor within the housing, the temperature sensor being movable axially of the housing between a retracted position within the housing and an extended position operatively associated with the opening to enable the temperature sensor to accurately sense the temperature of an object outside the housing;
   a chassis within the housing movable axially of the housing having a proximal and a distal end, the sensor being attached to the distal end of the chassis proximate the opening and the proximal end of the chassis being configured to extend axially from a proximal end of the housing opposite the opening with the sensor in the retracted position, the distal end of the chassis being advanced axially toward the housing to move the sensor to the extended position; and
   means operatively associated with the housing and the chassis biasing the chassis with the proximal end of the chassis extending from the proximal end of the housing and the sensor in the retracted position.

4. The apparatus of claim 3 further comprising a switch operatively associated with the temperature sensor for switching the temperature sensor between a dormant state and a sensing state, the apparatus further including means operatively associated with the switch for actuating the switch as the temperature sensor is moved from the retracted to the extended position to switch the temperature sensor to the sensing state.

5. The apparatus of claim 3 further comprising:
   a cover operatively associated with the opening, the cover being movable between a covering position covering the opening and an open position not covering the opening; and
   a link between the chassis and cover configured to move the cover between the covering position and the open position as the proximal end of the chassis is axially advanced toward the housing to move the sensor from the retracted position to the extended position.

6. A method of measuring the temperature of an object, the method comprising:
   a. providing a temperature sensor within an elongate housing extending along an axis, the sensor being movable axially within the housing relative to the housing between a retracted position and an extended position, the temperature sensor, in the retracted position, residing in the housing and in the extended position being positioned relative to the housing to accurately sense the temperature of an object outside the housing, the temperature sensor further having dormant state and a sensing state;
   b. moving the temperature sensor axially from the retracted position to the extended position;
   c. switching the temperature sensor from the dormant state to the sensing state during step b; and
   d. providing a chassis within the housing with the temperature sensor attached to a distal end of the chassis and a proximal end of the chassis extending axially outside the housing, step b. being performed by axially advancing the proximal end of the chassis toward the housing.

7. The method of claim 6 further comprising biasing the chassis with the proximal end of the chassis extending axially outside the housing.

* * * * *